Figure 1:
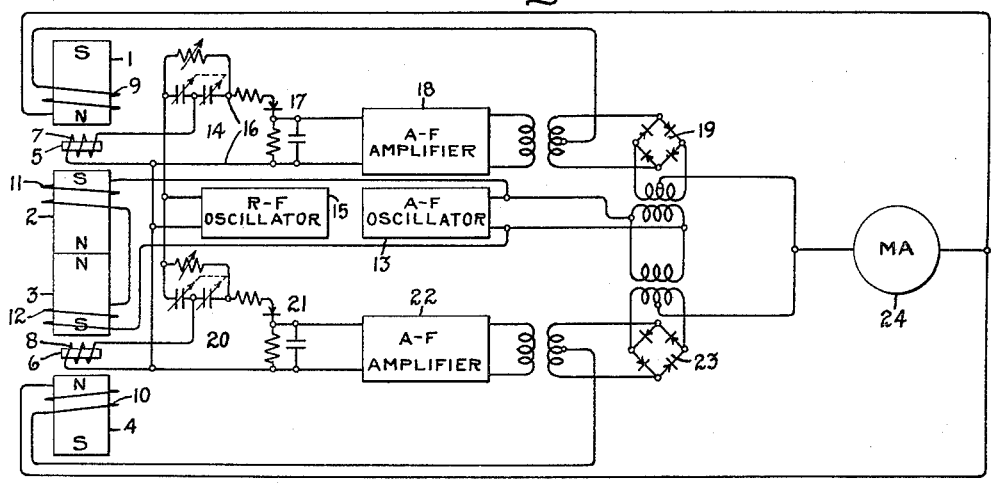

Dec. 8, 1959    B. D. LEETE    2,916,690
APPARATUS FOR MEASURING MAGNETIC FIELDS
Filed Dec. 6, 1952    2 Sheets-Sheet 1

Inventor:
Bernard D. Leete,
by Richard E. Hosley
His Attorney.

Dec. 8, 1959  B. D. LEETE  2,916,690
APPARATUS FOR MEASURING MAGNETIC FIELDS
Filed Dec. 6, 1952  2 Sheets-Sheet 2

Inventor:
Bernard D. Leete,
by Richard E. Horley
His Attorney.

United States Patent Office 2,916,690
Patented Dec. 8, 1959

2,916,690

APPARATUS FOR MEASURING MAGNETIC FIELDS

Bernard D. Leete, Peabody, Mass., assignor to General Electric Company, a corporation of New York Application December 6, 1952, Serial No. 324,541

17 Claims. (Cl. 324—.5)

My invention relates to improved apparatus for measuring magnetic fields, based upon magnetic resonance phenomena.

A brief description of magnetic resonance theory will aid the explanation of my invention. More complete treatments of the theory may be found in texts on atomic physics and in numerous articles which have appeared in scientific and technical publications. It will be understood that the theoretical matter presented here is for illustrative purposes only, and is not intended to limit the scope of my invention.

It is known that the nuclei of many atoms have an angular momentum, or spin, and likewise have a magnetic moment. When such nuclei are placed in a magnetic field, their magnetic moments tend to precess about the field direction at a rate known as the Larmor frequency, the value of which is given by the relation $2\pi\nu=\gamma H$, where $\nu$ is the Larmor, or precession, frequency, $H$ is the magnetic field intensity, and $\gamma$ is a quantity known as the gyromagnetic ratio which is proportional to the quotient of the magnetic moment of the nucleus divided by its angular momentum. For any one given kind of atomic nucleus, the gyromagnetic ratio is a constant, so that the Larmor frequency is directly proportional to the magnetic field intensity. The nuclei of 26 or more kinds of atoms and isotopes are known to have magnetic moments which precess in this manner. For simplicity in the following discussion, the proton, or hydrogen nucleus, will be considered as a typical example, but my invention is not limited to the use of protons, since other nuclei may be used without materially altering the principles involved.

Chemical bonds appear to have no appreciable effect upon the Larmor frequency. Consequently, the protons used in magnetic resonance apparatus may be hydrogen nuclei in any convenient chemical combination—for example, ordinary water. However, in practice small quantities of other substances, such as manganous sulphate or other paramagnetic salts, are often dissolved in the water for well-known reasons having to do with the "relaxation time," which need not be discussed to explain the present invention. A $\frac{1}{250}$ molar solution of manganous sulphate in one cc. of distilled water has been employed with good results as a proton sample in magnetic resonance equipment.

The gyromagnetic ratio $\gamma$ of the proton is approximately $2.67 \times 10^4$ per oersted-second. Thus, the Larmor frequency of proton precession in a magnetic field of $H$ oersteds is $$\frac{2.67}{2\pi} \times 10^4 \times H$$

cycles per second. For example, if $H$ is 10,000 oersteds, the Larmor frequency is approximately 42.5 megacycles per second.

Assume that a large number of protons are placed in a homogeneous, unidirectional magnetic field, so that the magnetic moments precess about the field direction at the Larmor frequency. Considering the geometric projections of the proton magnetic moments on the field direction, it will be found that two orientations of the protons exist: some of the protons have their magnetic moments aligned with the field, which is called the parallel orientation, while others have their magnetic moments aligned against the field, which is called the anti-parallel orientation. The anti-parallel orientation represents a higher energy level than the parallel orientation, since work must be done to turn the magnetic moments against the field. However, at temperatures normally encountered, the energy difference between the two orientations is very small compared to the energy of thermal agitation.

Because of the thermal effects, frequent transitions of individual nuclei from one orientation to the other occur, but if the protons are in thermal equilibrium, it is known that the probability as a function of time for a transition from the higher energy level to the lower energy level is slightly greater than the probability for the reverse transition, so that, under such conditions, a slightly larger number of protons will be found in the lower-energy parallel orientation than in the higher-energy anti-parallel orientation. For example, of 2,000,000 protons in thermal equilibrium at room temperature, 1,000,007 may have the parallel orientation, while the remainder have the anti-parallel orientation.

Assume that a second magnetic field is introduced at right angles to the first field, and that the second field alternates at the Larmor frequency of the protons precessing in the first field. Now, those protons having the low-energy parallel orientation can absorb energy from the alternating field, which increases the probability of transitions from the parallel orientation to the higher-energy anti-parallel orientation, and thus tends to equalize the numbers of protons in the two energy levels. If the alternating field is sufficiently strong, the proton populations in the two energy levels soon become substantially equal, and no more energy is absorbed. But if the alternating field is a bit weaker, the absorption of energy by the protons from the alternating field may be balanced by their tendency to return to thermal equilibrium, so that there can be substantially continuous absorption of energy from the alternating field. Therefore, there is an optimum strength of the alternating field, which can be determined by experimental adjustment, at which maximum energy is absorbed by the protons. Although quantum considerations prohibit more than two orientations of protons in a magnetic field, other nuclei may have as many as 10 possible orientations. This does not affect the basic principles involved, since transitions may still take place between adjacent energy levels represented by different orientations.

This absorption of energy by precessing nuclei, which generally occurs only when the frequency of the alternating field is substantially the same as the Larmor frequency of the nuclei, is called nuclear magnetic resonance. Similar phenomena, known as electronic magnetic resonance, can occur in substances having uncoupled electrons. In general, there are two classes of such substances, one class being strongly paramagnetic salts, and the other class being ferromagnetic metals and alloys.

For electronic magnetic resonance in paramagnetic salts, sometimes called paramagnetic resonance, the same relations apply as in proton resonance, except that the gyromagnetic ratio of the electron is used in place of the gyromagnetic ratio of the proton. Since the electron has a gyromagnetic ratio which is about 700 times as large as that of the proton, the Larmor frequency for paramagnetic resonance is about 700 times as great as that for proton resonance in the same magnetic field.

In ferromagnetic metals and alloys, the magnetic induction B inside the metal is not substantially equal to the magnetic field intensity H. In this electronic resonance case, sometimes called ferromagnetic resonance, the Larmor frequency $v$ is given by the relation $2\pi v = \gamma \sqrt{BH}$ where $\gamma$ is the gyromagnetic ratio of the electron, H is the magnetic field intensity, and B represents the magnetic induction which is equal to the product of the magnetic field intensity and the permeability of the metal. The present invention may utilize either nuclear magnetic resonance or electronic magnetic resonance. The generic term "magnetic resonance" includes both. Since the basic principles are the same, only nuclear resonance need be discussed in detail.

The magnetic resonance phenomenon can be detected by various means, several of which are well known. For example, assume that the alternating field is supplied by a suitably energized coil placed around the proton sample, which is a common arrangement in nuclear resonance apparatus. Energy absorption from the field by the protons at resonance causes a measurable decrease in the apparent "Q" of the coil, where Q is the well-known symbol for the ratio of energy stored per cycle to energy dissipated per cycle. This is known as the absorption effect. There is also a small, but measurable, change in the apparent inductance of the coil. This is known as the dispersion effect. Furthermore, when a second coil is placed near the proton sample with its axis orthogonal to the respective directions of the two applied magnetic fields, at resonance the precessing proton magnetic moments induce an alternating voltage in the second coil. This is known as the induction effect. While any of these three effects may be used to detect the existence of magnetic resonance conditions, in practice the absorption and induction effects are most frequently used.

It is apparent that magnetic resonance provides a very precise relation between magnetic intensity and frequency. Since means for measuring frequency with great precision are well known, magnetic fields can be measured by magnetic resonance means with much greater precision than by other means commonly employed. This has previously been done by others in the case of field strength measurements for strong magnetic fields. However, in the case of weak fields, a difficulty arises in that as the field becomes weaker, detection of the magnetic resonance phenomena becomes more difficult and it becomes correspondingly hard to determine precisely the magnetic resonance conditions. However, if a constant bias field of substantial intensity is provided, the change in the net magnetic intensity produced by a relatively weak field can be measured to determine the strength of the weak field. But this presents another difficulty, that of keeping the bias field precisely constant. For example, if a permanent magnet is used to supply the bias field, it will be found that the bias varies as a function of temperature.

A chief object of my invention is to provide improved apparatus for measuring the strength of weak magnetic fields, having greater precision and stability than can be obtained by means heretofore employed. Another object is to provide improved means for measuring magnetic field gradient. Other objects and advantages will appear as the description proceeds.

Briefly stated, according to one aspect of my invention, I provide two similar magnetic circuits in each of which the magnetic intensity is monitored by magnetic resonance means. Equal bias fields are applied to the two circuits, and the circuits are so arranged that the measured quantity affects the two magnetic intensities differently. This difference is measured. Changes in the bias means affect both intensities substantially equally, and therefore have relatively little effect upon the precision of measurement. If magnetic field strength is to be measured, the two bias fields are oppositely directed, so that the measured field tends to increase the magnetic intensity in one circuit and decrease the magnetic intensity in the other circuit. If magnetic field gradient is to be measured, the two bias fields are similarly directed, so that the measured field tends to either increase or decrease the magnetic intensity in both circuits, but by amounts which differ according to the average field gradient.

Figure 2:
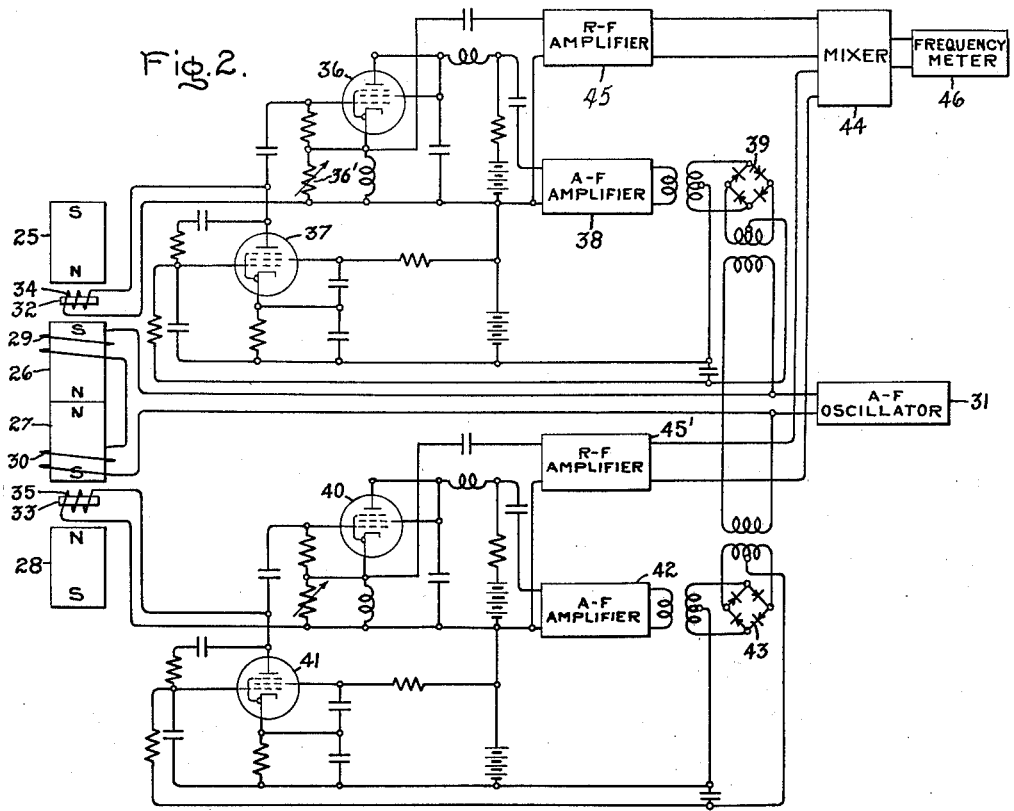
Figure 3:
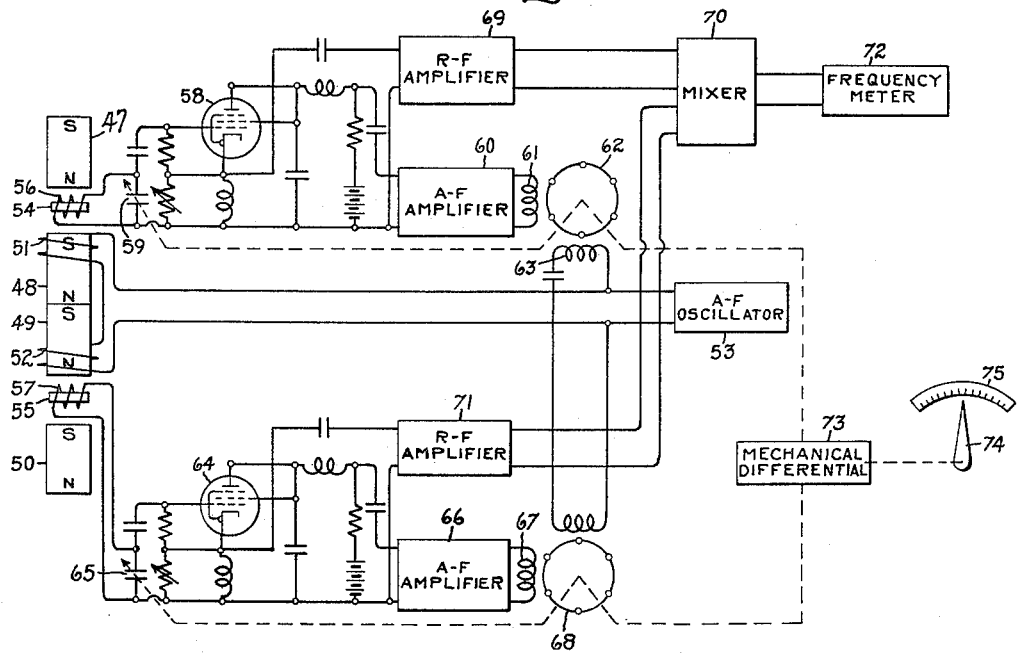
Figure 4:
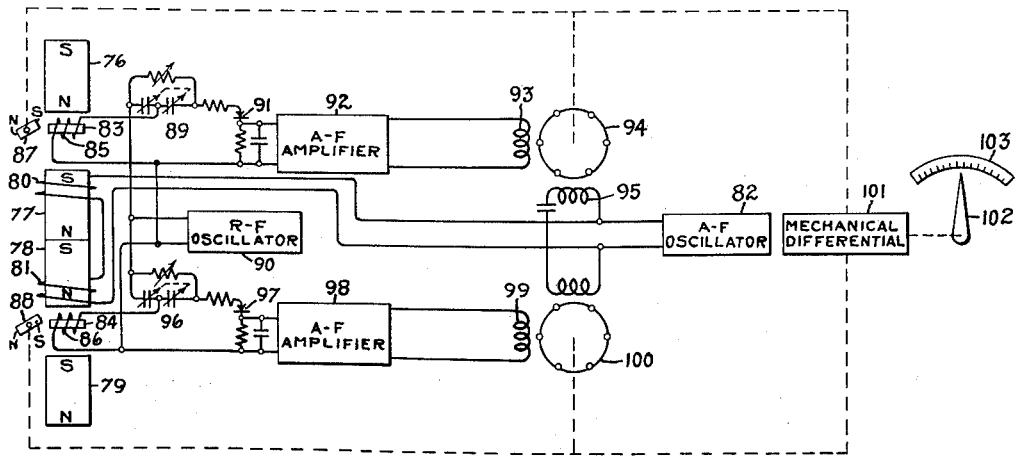

My invention will be better understood from the following description taken in connection with the accompanying drawings, and its scope will be pointed out in the appended claims. In the drawings, Fig. 1 is a schematic representation of improved apparatus for measuring magnetic field strength, Fig. 2 is a schematic representation of other improved apparatus for measuring magnetic field strength, Fig. 3 is a schematic representation of improved apparatus for measuring magnetic field gradient, and, Fig. 4 is a schematic representation of other improved apparatus for measuring magnetic field gradient.

Referring now to Fig. 1 of the drawings, a magnetic structure may comprise four identical permanent magnets, 1, 2, 3, and 4, arranged in axial alignment as shown. Substantially equal gaps are provided between magnets 1 and 2 and between magnets 3 and 4, so that the permanent magnets provide equal, but oppositely directed, bias magnetic fields across the two gaps. To the extent that the magnets are identical, any factors, such as temperature variations, which tend to change the strength of one permanent magnet produce equal changes in the other permanent magnets, so that the two bias fields remain substantially equal. However, an external magnetic field having a component in the direction of the common axis of the permanent magnets will affect the respective magnetic intensities in the two gaps differently, for example, by increasing the magnetic intensity in one gap while reducing the magnetic intensity in the other gap. Thus, the external field, the strength of which is to be measured, tends to produce an inequality of the two magnetic intensities.

Magnetic resonance samples 5 and 6 are located in the respective gaps, as shown. If proton resonance is to be used, the magnetic resonance samples may be small quantities of water contained in small glass tubes sealed at each end, or in other suitable containers. Coils 7 and 8 are positioned about samples 5 and 6 respectively, with the coil axes perpendicular to the magnetic fields across the gaps. Coils 7 and 8 are energized by radio-frequency current, as hereinafter explained, to produce magnetic resonance conditions in samples 5 and 6.

A winding 9 is arranged to change the magnetic intensity in only the upper of the two gaps, and a winding 10 is arranged to change the magnetic intensity in only the lower of the two gaps. Windings 9 and 10 are energized as hereinafter explained to keep the average magnetic intensities in samples 5 and 6 substantially at the magnetic resonance value. To aid in detecting resonance conditions, modulating windings 11 and 12 are energized at an audio frequency by suitable means, such as audio frequency oscillator 13. Windings 11 and 12 modulate the magnetic intensities in the two gaps at an audio frequency.

Coil 7 is connected in a bridge circuit 14 which is energized by a radio-frequency oscillator 15 to supply radio-frequency current to coil 7. The bridge circuit shown is of the well-known bridge-T type, but it will be appreciated that numerous other bridge circuits can be used with good results. As is known, the bridge-T circuit, when balanced, has zero transfer admittance.

Assume, for example, that circuit 14 is adjusted to balance when there is no magnetic resonance absorption of energy by sample 5. Then, when sample 5 absorbs energy under magnetic resonance conditions, the apparent resistance of coil 7 increases, and bridge circuit 14 becomes unbalanced. The bridge circuit then transmits radio-frequency energy to its output terminals 16. Since the magnetic intensity in sample 5 is modulated through the magnetic resonance value by modulating winding 11, the radio-frequency signal at terminals 16 is amplitude modulated at an audio rate. This signal is demodulated by suitable means, such as rectifier-demodulator 17, and amplified by audio-frequency amplifier 18 to provide an audio-frequency error signal, the phase of which depends upon whether the average magnetic intensity in sample 5 is above or below the magnetic resonance value. This error signal is applied to a phase-sensitive detector 19, which may be of a well-known type as shown, which then supplies direct current to winding 9, energizing this winding sufficiently to keep the average magnetic intensity in sample 5 substantially at the magnetic resonance value. In practice, it is not essential that the bridge circuit be precisely balanced—in fact, some unbalance may be desirable.

Similarly, coil 8 is connected in a bridge circuit 20, also energized by radio-frequency oscillator 15, and the output signal from bridge circuit 20 is demodulated by rectifier-demodulator 21 and amplified by audio-frequency amplifier 22 to provide a second audio-frequency error signal. This second error signal is applied to phase-sensitive detector 23, which supplies direct current to winding 10 to keep the average magnetic intensity in sample 6 substantially at the magnetic resonance value.

In the absence of any external field, the currents supplied to windings 9 and 10 are equal. When an external field is present, unequal currents must be supplied to windings 9 and 10 to keep the respective magnetic intensities in both of the samples 5 and 6 at the magnetic resonance value. The difference between the respective values of these two currents is related to the strength of the external field to be measured. This difference in current values can be measured by any suitable means, such as a milliammeter 24 differentially connected in the two feedback circuits as shown.

Fig. 2 shows another form of apparatus for measuring magnetic field strength. A magnetic structure comprises four identical permanent magnets 25, 26, 27, and 28, arranged in axial alignment. Equal gaps are provided between magnets 25 and 26 and between magnets 27 and 28, and across these gaps the permanent magnets provide equal, but oppositely directed, magnetic fields. The field intensities are modulated at an audio frequency by modulating windings 29 and 30 energized by suitable means, such as audio-frequency oscillator 31. Magnetic resonance samples 32 and 33 are located in the respective gaps as shown. Coils 34 and 35 are positioned about samples 32 and 33, respectively, with the coil axes perpendicular to the magnetic fields across the gaps.

Coil 34 is energized by a grid-biased radio-frequency oscillator 36. The frequency of oscillator 36 is regulated by reactance tube means 37. Preferably, oscillator 36 is of a regenerative detector type, as shown, with its feedback resistor 36' adjusted so that oscillations are just sustained. The amplitude of oscillation is determined by the energy absorbed by sample 32, and this in turn controls the grid bias applied to the oscillator tube and thus controls the amount of current conducted by the tube. Consequently, as the magnetic intensity in sample 32 is modulated through the magnetic resonance value, the current conducted by oscillator 36 varies at an audio frequency. This provides a signal which is amplified by audio-frequency amplifier 38 to provide an audio-frequency error signal, the phase of which depends upon whether the average magnetic intensity in sample 32 is above or below the magnetic resonance value. This error signal is applied to a phase-sensitive detector 39 of conventional type, which controls the reactance tube means 37 to keep the frequency of oscillator 36 substantially at the magnetic resonance value corresponding to the average magnetic intensity in sample 32. Thus, oscillator 36 provides a radio frequency signal, the frequency of which is proportional to the average magnetic intensity in sample 32.

Similarly, coil 35 is energized by an oscillator 40, the frequency of which is regulated by reactance tube means 41. The audio-frequency signal from oscillator 40 is amplified by audio-frequency amplifier 42, thus supplying to phase-sensitive detector 43 an audio-frequency error signal, the phase of which depends upon whether the average magnetic intensity in sample 33 is above or below the magnetic resonance value. Detector 43 controls reactance tube means 41 to keep the frequency of oscillator 40 substantially at the magnetic resonance value corresponding to the average magnetic intensity in sample 33. Oscillator 40 thus provides a radio frequency signal, the frequency of which is proportional to the magnetic intensity in sample 33.

In the absence of an external magnetic field, the average magnetic intensities in samples 32 and 33 are equal, and consequently the respective radio-frequency signals provided by oscillators 36 and 40 have the same frequency. When an external field is applied, which is to be measured, the average magnetic intensities in samples 32 and 33 are not the same, and consequently there is a difference in frequency between the respective radio-frequency signals supplied by oscillators 36 and 40. This frequency difference is proportional to the strength of the applied field.

To measure this frequency difference, the radio-frequency signal provided by oscillator 36 may be amplified by a radio-frequency amplifier 45, and then applied to a conventional mixer 44. The signal provided by oscillator 40 may be amplified by a radio-frequency amplifier 45' and then also applied to mixer 44. The mixer 44 provides an output signal which has a frequency equal to the difference between the frequencies of oscillators 36 and 40. This difference frequency may be measured by a conventional frequency meter 46.

The arrangement shown in Fig. 2 is especially advantageous when indications are to be telemetered over a considerable distance. For example, the output signals from amplifiers 45 and 45' can be transmitted by wire or radio to a distant location, where a mixer and frequency meter can be used to obtain the field strength indication. Alternatively, the difference frequency from mixer 44 can be telemetered to a distant frequency meter.

Fig. 3 shows apparatus for measuring magnetic field gradient. A magnetic structure comprises identical permanent magnets 47, 48, 49, and 50, arranged in axial alignment, with equal gaps between magnets 47 and 48 and between magnets 49 and 50. The permanent magnets provide equal magnetic fields across the two gaps, but in this case the polarities of the magnets are arranged so that these two fields are similarly directed. With this arrangement, an applied external field either increases or decreases the magnetic intensities in both gaps, but by unequal amounts depending upon the average field gradient between the two gaps.

The two magnetic intensities are modulated at an audio frequency by modulating windings 51 and 52 energized by suitable means, such as audio-frequency oscillator 53. Magnetic resonance samples 54 and 55 are respectively located in the two gaps as shown. Coils 56 and 57 are positioned about samples 54 and 55 respectively, with the coil axes perpendicular to the magnetic fields across the gaps.

Coil 56 is energized by a radio-frequency oscillator 58, the frequency of which is regulated by adjustment of a variable capacitor 59. Audio-frequency amplifier 60 provides an audio-frequency error signal, the phase of which is determined by whether the average magnetic intensity in sample 54 is above or below the magnetic resonance value. This error signal is applied to the control winding 61 of a two-phase induction servomotor 62. The field winding 63 of motor 62 is energized by audio-frequency oscillator 53. Motor 62 rotates in a direction which depends upon the phase of the error signal supplied to its control winding 61, and automatically adjusts variable capacitor 59 to keep the frequency of oscillator 58 at the magnetic resonance value corresponding to the average magnetic intensity in sample 54. Thus, oscillator 58 provides a radio-frequency signal, the frequency of which is substantially proportional to the average magnetic intensity in sample 54.

Coil 57 is energized by radio-frequency oscillator 64, the frequency of which is regulated by adjustment of variable capacitor 65. Audio-frequency amplifier 66 supplies an audio-frequency error signal to the control winding 67 of a two-phase induction servomotor 68. Motor 68 automatically adjusts variable capacitor 65 to keep the frequency of oscillator 64 substantially at the magnetic resonance value corresponding to the average magnetic intensity in sample 55. Thus, oscillator 64 provides a radio-frequency signal, the frequency of which is substantially proportional to the average magnetic intensity in sample 55.

When the magnetic field gradient between the two gaps is zero, the average magnetic intensities in samples 54 and 55 are equal, and consequently the frequencies of oscillators 58 and 64 are equal. But when the magnetic gradient is not zero, the magnetic intensities in the two samples are unequal, and consequently the frequencies of the two radio-frequency oscillators are unequal. The difference between the two oscillator frequencies is proportional to the average magnetic field gradient between the two gaps of the magnetic structure.

The difference between the frequencies of oscillators 58 and 64 may be measured in the following manner: The radio-frequency signal from oscillator 58 is amplified by radio-frequency amplifier 69 and then applied to mixer 70. The radio-frequency signal from oscillator 64 is amplified by radio-frequency amplifier 71 and also applied to mixer 70. The mixed provides a signal having a frequency equal to the difference between the oscillator frequencies, which may be measured by a conventional frequency meter 72.

Alternatively, the difference between the oscillator frequencies can be determined by measuring the difference between the respective settings of variable capacitors 59 and 65. This can conveniently be done by having respective shafts connected to adjust the variable capacitors, and also connected to a mechanical differential 73 which positions a pointer 74 in accordance with the difference between the two shaft positions. Pointer 74 may cooperate with a suitably calibrated scale 75.

Fig. 4 shows another form of apparatus for measuring magnetic field gradient. A magnetic structure comprises identical permanent magnets 76, 77, 78, and 79, arranged in axial alignment as shown, with substantially equal gaps between magnets 76 and 77 and between magnets 78 and 79. The permanent magnets provide equal and similarly directed bias magnetic fields across the two gaps. The two magnetic intensities are modulated at an audio frequency by modulating windings 80 and 81 energized by suitable means such as audio-frequency oscillator 82. Magnetic resonance samples 83 and 84 are located within the respective gaps as shown. Coils 85 and 86 are positioned about samples 83 and 84, respectively, with the coil axes perpendicular to the magnetic fields across the gaps.

A small permanent magnet 87 is adjustably positioned to change the magnetic intensity in sample 83. For example, magnet 87 may be rotatable about its center. Magnet 87 produces a maximum change in the magnetic intensity when it is aligned with the field across the upper gap, and produces minimum change in the magnetic intensity when it is perpendicular to this field. A similar permanent magnet 88 is adjustable positioned to change the magnetic intensity in sample 84.

Coil 85 is connected in a bridge circuit 89 energized by a radio-frequency oscillator 90. The output of bridge circuit 89 is demodulated by suitable means, such as rectifier-demodulator 91, and amplified by audio-frequency amplifier 92 to provide an audio-frequency error signal the phase of which depends upon whether the average magnetic intensity in sample 83 is above or below the magnetic resonance value. This error signal is applied to the control winding 93 of a two-phase induction servomotor 94. The field winding 95 of motor 94 is energized by audio-frequency oscillator 82. Motor 94 rotates in a direction depending upon the phase of the error signal supplied to winding 93, and thus automatically adjusts the position of magnet 87 to keep the average magnetic intensity in sample 83 substantially at the magnetic resonance value.

Coil 86 is connected in a bridge circuit 96 which is also energized by radio-frequency oscillator 90. The output of bridge circuit 96 is demodulated by suitable means, such as rectifier-demodulator 97, and amplified by audio-frequency oscillator 98 to provide a second audio-frequency error signal, the phase of which depends upon whether the average magnetic intensity in sample 84 is above or below the magnetic resonance value. This second error signal is applied to the control winding 99 of a two-phase induction servomotor 100. Motor 100 automatically adjusts the position of magnet 88 to keep the average magnetic intensity in sample 84 substantially at the magnetic resonance value.

The difference between the respective position of magnets 87 and 88 depends upon the average magnetic field gradient between the two gaps of the magnetic structure. This difference of position may be indicated by any suitable means, such as a mechanical differential 101 which positions a pointer 102 relative to a suitably calibrated scale 103 to indicate the value of the measured field gradient.

The apparatus shown in Fig. 1 and the apparatus shown in Fig. 2 can be modified to measure magnetic field gradient, and the apparatus shown in Fig. 3 and the apparatus shown in Fig. 4 can be modified to measure magnetic field intensity, merely by changing the polarities of the permanent magnets. Also, many other forms of magnetic structure, having different numbers of permanent magnets, or different arrangements of the magnets, can be devised readily to accomplish the desired purpose, without departing from the principles of my invention. For example, instead of arranging the two gaps in series with respect to the magnetic circuit, they can be arranged in parallel. Likewise, many changes and substitutions can be made in the electrical circuits without altering the principles involved. Although all of the embodiments described utilize the absorption effect of magnetic resonance, arrangements using other effects of magnetic resonance, such as the induction effect, will be apparent to those skilled in the art.

It will be understood that my invention is not limited to the specific embodiments herein illustrated and described, and that the following claims are intended to cover all changes and modifications which do not depart from the true spirit and scope of the invention.

What I claim as new and desire to secure by Letters Patent of the United States is:

1. Apparatus for measuring a characteristic of a relatively weak magnetic field comprising a magnetic structure having at least two gaps, said structure including means providing separate bias magnetic fields within said gaps, both of said separate fields being relatively strong in intensity compared with the intensity of said weak field, the directions of said separate fields bearing a predetermined relationship to one another in accordance with the characteristic of said weak field to be measured, first and second magnetic resonance apparatus responsive respectively to the magnetic intensities in each of said gaps, said first and second magnetic resonance apparatus functioning to establish first and second electrical signals respectively related in value to the magnetic intensities in corresponding gaps, said signals being identical in the absence of said weak field, said weak field when present having the same direction in said gaps but affecting the intensity of said separate fields differently in said gaps in accordance with said predetermined relationship of the directions of said separate fields, said electrical signals differing from each other when said weak field is present in said gaps by an amount related in value to the magnitude of said characteristic being measured, and means to measure said difference in said electrical signals.

2. Apparatus for measuring a characteristic of a relatively weak magnetic field comprising means providing equal bias magnetic fields at two locations, both of said bias fields being relatively strong in intensity compared with the intensity of said weak field, the directions of said bias fields bearing a predetermined relationship to one another in accordance with the characteristic of said weak field to be measured, first and second magnetic resonance apparatus responsive respectively to the magnetic intensities at each of said two locations, said first and second magnetic resonance apparatus functioning to establish first and second electrical signals respectively related in value to the magnetic intensities at corresponding locations, said signals being identical in the absence of said weak field, said weak field when present having the same direction at each of said locations but affecting the intensity of said separate fields differently at each location in accordance with said predetermined relationship of the directions of said separate fields, said electrical signals differing from each other when said weak field is present in each of said locations by an amount related in value to the magnitude of said characteristic being measured, and means to measure said difference in said electrical signals.

3. Apparatus for measuring a characteristic of a relatively weak magnetic field comprising a magnetic structure having at least two gaps, said structure including means providing separate bias magnetic fields within said gaps, said separate fields being equal and relatively strong in intensity compared with the intensity of said weak field, the directions of said separate fields bearing a predetermined relationship to one another in accordance with the characteristic of said weak field to be measured, first and second magnetic resonance apparatus responsive respectively to the magnetic intensities in each of said gaps, said first and second magnetic resonance apparatus functioning to establish first and second electrical signals respectively related in value to the magnetic intensities in corresponding gaps, said signals being identical in the absence of said weak field, said weak field when present having the same direction in said gaps but affecting the intensity of said separate fields differently in said gaps in accordance with said predetermined relationship of the directions of said separate fields, said electrical signals differing from each other when said weak field is present in said gaps by an amount related in value to the magnitude of said characteristic being measured, and means to measure said difference in said electrical signals.

4. Apparatus for measuring the strength of magnetic fields comprising a magnetic structure having at least two gaps, said structure including permanent magnet means providing equal but oppositely directed magnetic fields across said two gaps, so that the measured field increases the magnetic intensity in one of said gaps and decreases the magnetic intensity in the other of said gaps, thereby making the two magnetic intensities unequal to a degree depending upon the strength of the measured field, first and second magnetic resonance apparatus responsive respectively to the magnetic intensities in each of said gaps, said first and second magnetic resonance apparatus functioning to establish first and second electrical signals respectively related in value to the magnetic intensities of corresponding gaps, said signals being equal in the absence of the field to be measured, said electrical signals differing from each other when said field to be measured is present by an amount related in value to the strength of the field being measured, and means to measure said difference in said electrical signals.

5. Apparatus for measuring the gradient of magnetic fields comprising a magnetic structure having at least two gaps, said structure including permanent magnet means providing equal and similarly directed magnetic fields across said two gaps, so that the measured field changes the respective magnetic intensities in said gaps by amounts which differ according to the gradient of the measured field, first and second resonance apparatus responsive respectively to the magnetic intensities in each of said gaps, said first and second magnetic resonance apparatus functioning to establish first and second electrical signals respectively related in value to the magnetic intensities in corresponding gaps, said signals being equal in the absence of said field being measured, said signals differing from each other when said field to be measured is present by an amount related in value to the magnitude of said gradient, and means to measure said difference in said electrical signals.

6. Apparatus for measuring a characteristic of a relatively weak magnetic field comprising a magnetic structure having at least two gaps, said structure including means providing separate biasing magnetic fields within said gaps, both of said separate fields being relatively strong in intensity compared with the intensity of said weak field, the directions of said separate fields bearing a predetermined relationship to one another in accordance with the characteristic of said weak field to be measured, a first winding arranged on said structure to change when energized the magnetic intensity in only the first of said gaps, a second winding arranged on said structure to change when energized the magnetic intensity in only the second of said gaps, first magnetic resonance apparatus supplying current to said first winding to keep the average magnetic intensity in said first gap substantially constant, second magnetic resonance apparatus supplying current to said second winding to keep the average magnetic intensity in said second gap substantially constant, said currents being equal in the absence of said weak field, said weak field when present having the same direction in said gaps but affecting the intensity of said separate fields differently in said gaps, said currents differing from each other when said weak field is present in said gaps by an amount related in value to the magnitude of said characteristic being measured, and means to measure said difference in said currents.

7. Apparatus for measuring the strength of magnetic fields, comprising a magnetic structure having at least two gaps, said structure including permanent magnet means providing equal but oppositely directed magnetic fields across said two gaps, so that the measured field increases the magnetic intensity in one of said gaps and decreases the magnetic intensity in the other of said gaps, thereby tending to make the two magnetic intensities unequal to a degree depending upon the strength of the measured field, first windings arranged to change when energized the magnetic intensity in only the first of said gaps, second windings arranged to change when energized the magnetic intensity in only the second of said gaps, first magnetic resonance apparatus supplying current to said first windings to keep the average magnetic intensity in said first gap substantially constant, second magnetic resonance apparatus supplying current to said second windings to keep the average magnetic intensity in said second gap substantially constant, said currents being equal in the absence of said field to be measured, said currents differing from each other when said field to be measured is present by an amount related in value to the strength of the field being measured, and means to measure said difference in said currents.

8. Apparatus for measuring the strength of magnetic fields comprising a magnetic structure having at least two gaps, said structure including permanent magnet means providing equal but oppositely directed magnetic fields across said two gaps, so that the measured field increases the magnetic intensity in one of said gaps and decreases the magnetic intensity in the other of said gaps, thereby tending to make the two magnetic intensities unequal to a degree depending upon the strength of the measured field, first windings arranged to change when energized the magnetic intensity in only the first of said gaps, second windings arranged to change when energized the magnetic intensity in only the second of said gaps, means for modulating the two magnetic intensities at an autdio frequency, first and second magnetic resonance samples located in said first and second gaps respectively, first and second coils respectively positioned about said first and second samples with the coil axes perpendicular to the magnetic fields across the gaps, first and second bridge circuits, a radio-frequency oscillator energizing said bridge circuits, said first and second coils being connected in said first and second bridge circuits respectively and thereby being energized at the radio frequency of said oscillator, each of said bridge circuits providing a radio-frequency output which is amplitude modulated in accordance with the magnetic resonance absorption of energy by the corresponding one of said samples, means demodulating and amplifying the output of said first bridge circuit to provide a first audio-frequency error signal having a phase depending upon whether the average magnetic intensity in said first sample is above or below the magnetic resonance value, means demodulating and amplifying the output of said second bridge circuit to provide a second audio-frequency error signal having a phase depending upon whether the average magnetic intensity in said second sample is above or below the magnetic resonance value, a first phase-sensitive detector responsive to said first error signal and supplying current to said first windings to keep the average magnetic intensity in said first sample substantially constant, a second phase sensitive detector responsive to said second error signal and supplying current to said second windings to keep the average magnetic intensity in said second sample substantially constant, said currents being equal in the absence of said field to be measured, said currents differing from each other when said field to be measured is present by an amount related in value to the strength of said field to be measured, and means to measure said difference in said currents.

9. Apparatus for measuring a characteristic of a relatively weak magnetic field comprising a magnetic structure having at least two gaps, said structure including means providing separate bias magnetic fields within said gaps, both of said separate fields being relatively strong in intensity compared with the intensity of said weak field, the directions of said separate fields bearing a predetermined relationship to one another in accordance with the characteristic of said weak field to be measured, first and second magnetic resonance apparatus responsive respectively to the magnetic intensities in each of said gaps, said first and second magnetic resonance apparatus supplying first and second output signals having frequencies proportional to the average magnetic intensity in corresponding gaps, said frequencies being equal in the absence of said weak field, said weak field when present having the same direction in said gaps but affecting the intensity of said separate fields differently in said gaps, said frequencies differing from each other when said weak field is present by an amount related in value to the magnitude of said characteristic being measured, and means to measure said difference in said frequencies.

10. Apparatus for measuring the strength of magnetic fields comprising a magnetic structure having at least two gaps, said structure including permanent magnet means providing equal but oppositely directed magnetic fields across said two gaps, so that the measured field increases the magnetic intensity in one of said gaps and decreases the magnetic intensity in the other of said gaps, thereby making the two magnetic intensities unequal to a degree depending upon the strength of the measured field, first magnetic resonance apparatus supplying a first output signal having a frequency proportional to the average magnetic intensity in the first of said gaps, second magnetic resonance apparatus supplying a second output signal having a frequency proportional to the average magnetic intensity in the second of said gaps, said frequencies being equal in the absence of said field to be measured, said frequencies differing from each other when said field to be measured is present by an amount related in value to the strength of the field to be measured, and means to measure said difference in said frequencies.

11. Apparatus for measuring the strength of magnetic fields comprising a magnetic structure having at least two gaps, said structure including permanent magnet means providing equal but oppositely directed magnetic fields across said two gaps, so that the measured field increases the magnetic intensity in one of said gaps and decreases the magnetic intensity in the other of said gaps, thereby making the two magnetic intensities unequal to a degree depending upon the strength of the measured field, means for modulating the two magnetic intensities at an audio frequency, first and second magnetic resonance samples located in the first and second of said gaps respectively, first and second coils respectively positioned about said first and second samples with the coil axes perpendicular to the magnetic fields across the gaps, first and second grid-biased radio-frequency oscillator means connected to energize said first and second coils respectively, said first and second oscillator means respectively providing first and second radio-frequency output signals and also providing first and second audio-frequency error signals, first and second reactance tube means respectively regulating the frequencies of said first and second oscillator means, a first phase-sensitive detector responsive to said first error signal controlling said first reactance tube means to keep the frequency of said first oscillator means substantially at the magnetic resonance value proportional to the average magnetic intensity in said first sample, a second phase-sensitive detector responsive to said second error signal controlling said second reactance tube means to keep the frequency of said second oscillator means substantially at the magnetic resonance value proportional to the average magnetic intensity in said second sample, said frequencies being equal in the absence of said field to be measured, said frequencies differing from each other when said field to be measured is present by an amount related in value to the strength of the field to be measured, and means to measure said difference in said frequencies.

12. Apparatus for measuring a characteristic of a relatively weak magnetic field comprising a magnetic structure having at least two gaps, said structure including means providing separate bias magnetic fields within said gaps, both of said separate fields being relatively strong in intensity compared with the intensity of said weak field, the directions of said separate fields bearing a predetermined relationship to one another in accordance with the characteristic of said weak field to be measured, first and second magnetic resonance apparatus responsive respectively to the magnetic intensities in each of said gaps, first and second independently movable members, first magnetic resonance apparatus automatically positioning said first movable member in accordance with the average magnetic intensity in the first of said gaps, second magnetic resonance apparatus automatically positioning the second movable member in accordance with the average magnetic intensity in the second of said gaps, said movable members having corresponding positions in the absence of said weak field, said weak field when present having the same direction in said gaps but affecting the intensity of said separate fields differently in said gaps, said movable members assuming positions differing from each other when said weak field is present by an amount related to the magnitude of said characteristic being measured, and means responsive to motion of both of said movable members to measure said difference in position.

13. Apparatus for measuring the gradient of magnetic fields comprising a magnetic structure having at least two gaps, said structure including permanent magnet means providing equal and similarly directed magnetic fields across said two gaps, so that the measured field changes the respective magnetic intensities in said gaps by amounts which differ according to the gradient of the measured field, means for modulating the two magnetic intensities at an audio frequency, first and second magnetic resonance samples located in the first and second of said gaps respectively, first and second coils respectively positioned about said first and second samples with the coil axes perpendicular to the magnetic fields across the gaps, first and second grid-biased radio-frequency oscillator means connected to energize said first and second coils respectively, said first and second oscillator means respectively including first and second variable capacitors for adjusting the oscillator frequencies, said first and second oscillator means respectively providing first and second audio-frequency error signals, first servomotor means responsive to said first error signal automatically adjusting said first variable capacitor to keep the frequency of said first oscillator means substantially at the magnetic resonance value proportional to the average magnetic intensity in said first sample, second servomotor means responsive to said second error signal automatically adjusting said second variable capacitor to keep the frequency of said second oscillator means substantially at the magnetic resonance value proportional to the average magnetic intensity in said second sample, said first and second oscillator frequencies being equal in the absence of said field to be measured, said first and second oscillator frequencies differing from each other when said field to be measured is present by an amount related in value to the gradient of the field to be measured, and means to measure said difference in said oscillator frequencies.

14. Apparatus for measuring a characteristic of a relatively weak magnetic field comprising a magnetic structure having at least two gaps, said structure including means providing separate bias magnetic fields within said gaps, both of said separate fields being relatively strong in intensity compared with the intensity of said weak field, the directions of said separate fields bearing a predetermined relationship to one another in accordance with the characteristic of said weak field to be measured, first and second magnetic resonance apparatus responsive respectively to the magnetic intensities in each of said gaps, first and second movable permanent magnet means arranged respectively in each of said gaps, said first and second magnetic resonance apparatus automatically adjusting the position of said permanent magnet means to keep the magnetic intensities in both of said gaps substantially equal, said movable magnet means assuming identical positions in said gaps in the absence of said weak field, said weak field when present having the same direction in said gaps but affecting the intensity of said separate fields differently in said gaps, said movable magnet means assuming positions differing from each other when said weak field is present in said gaps, said difference in position of said magnets being related to the magnitude of said characteristic being measured, and means responsive to the motion of both of said movable magnet means to measure said difference in position between the two.

15. Apparatus for measuring the gradient of magnetic fields comprising a magnetic structure having at least two gaps, said structure including permanent magnet means providing equal and similarly directed magnetic fields across said two gaps, so that the measured field tends to change the respective magnetic intensities in said gaps by amounts which differ according to the gradient of the measured field, a first movable magnet for changing the magnetic intensity in the first of said gaps, a second movable magnet for changing the magnetic intensity in the second of said gaps, first magnetic resonance apparatus automatically adjusting the position of said first movable magnet to keep the average magnetic intensity in said first gap substantially constant, second magnetic resonance apparatus automatically adjusting the position of second movable magnet to keep the average magnetic intensity in said second gap automatically constant, said first and second movable magnets assuming identical positions in the absence of said field to be measured, said first and second movable magnets assuming respectively different positions in the presence of the magnetic field to be measured, the difference in positions of the movable magnets being related to the magnitude of the gradient of the magnetic field to be measured, and means responsive to the motion of both of said magnets to measure said difference in respective positions.

16. Apparatus for measuring the gradient of magnetic fields comprising a magnetic structure having at least two gaps, said structure including permanent magnet means providing equal and similarly directed magnetic fields across said two gaps, so that the measured field tends to change the respective magnetic intensities in said gaps by amounts which differ according to the gradient of the measured field, a first movable magnet for changing the magnetic intensity in the first of said gaps, a second movable magnet for changing the magnetic intensity in the second of said gaps, means for modulating the two magnetic intensities at an audio frequency, first and second magnetic resonance samples located in said first and second gaps respectively, first and second coils respectively positioned about said first and second samples with the coil axes perpendicular to the magnetic fields across the gaps, first and second bridge circuits, a radio-frequency oscillator energizing said bridge circuits, said first and second coils being connected in said first and second bridge circuits respectively and thereby being energized at the radio frequency of said oscillator, each of said bridge circuits providing a radio-frequency output which is amplitude modulated in accordance with the magnetic resonance absorption of energy by the corresponding one of said samples, means demodulating and amplifying the output of said first bridge circuit to provide a first audio-frequency error signal having a phase depending upon whether the average magnetic intensity in said first sample is above or below the magnetic resonance value, means demodulating and amplifying the output of said second bridge circuit to provide a second audio-frequency error signal having a phase depending upon whether the average magnetic intensity in said second sample is above or below the magnetic resonance value, first servomotor means responsive to said first error signal automatically adjusting the position of said first movable magnet to keep the average magnetic intensity in said first sample substantially constant, second servomotor means responsive to said second error signal automatically adjusting the position of said second movable magnet to keep the average magnetic intensity in said second sample substantially constant, said first and second movable magnets assuming identical positions in the absence of said field to be measured, said first and second movable magnets assuming respectively different positions in the presence of the magnetic field to be measured, the difference in positions of the movable magnets being related to the magnitude of the gradient of the magnetic field to be measured, and means responsive to the motion of both of said magnets to measure said difference in respective positions.

17. In combination, means for producing a pair of mutually aligned magnetic fields having equal intensities, said fields extending in opposite directions such that when said means is placed in a third magnetic field substantially aligned with said pair of fields and extending in one of said directions, one of said pair of magnetic fields is increased proportionally to said third field while the other of said pair of magnetic fields is decreased, two volumes of matter having portions of atoms having the properties of magnetic moment and gyroscopic moment, each volume being within a different one of said pair of aligned magnetic fields, the strength of the magnetic fields determining the frequency of precession of the portions of atoms in each volume, means for producing Larmor precession of the atom portions in said fields, and means coupled to said volumes of matter for determining the difference between the frequencies of precession of the gyromagnetic portions of atoms in each volume of matter.

References Cited in the file of this patent

UNITED STATES PATENTS

| | | |
|---|---|---|
| 2,440,503 | Fay | Apr. 27, 1948 |
| 2,561,489 | Bloch et al. | July 24, 1951 |
| 2,561,490 | Varian | July 24, 1951 |
| 2,589,494 | Hershberger | Mar. 18, 1952 |
| 2,620,381 | Mayes et al. | Dec. 2, 1952 |

OTHER REFERENCES

Instruments, May 1949, pages 430–432, article by Thomas et al. (Copy in Science Library.)

The Review of Scientific Instruments, June 1949, vol. 20, No. 6, pages 401–402, article by Hopkins. (Copy in Science Library.)